United States Patent
Vehra et al.

(10) Patent No.: US 7,839,148 B2
(45) Date of Patent: Nov. 23, 2010

(54) METHOD AND SYSTEM FOR CALIBRATING DOWNHOLE TOOLS FOR DRIFT

(75) Inventors: Imran Vehra, Houston, TX (US); James J. Freeman, Spring, TX (US); Christopher A. Golla, Kingwood, TX (US); Randal T. Beste, Houston, TX (US); Michael S. Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 52 days.

(21) Appl. No.: 11/396,494

(22) Filed: Apr. 3, 2006

(65) Prior Publication Data

US 2007/0229082 A1    Oct. 4, 2007

(51) Int. Cl.
*G01V 3/00* (2006.01)
(52) U.S. Cl. .................. 324/338; 324/339; 324/202
(58) Field of Classification Search .............. 324/338, 324/339, 333, 340, 341, 342, 343, 346, 351, 324/352, 353, 355, 356, 366, 202
See application file for complete search history.

(56) References Cited

U.S. PATENT DOCUMENTS

| | | | | |
|---|---|---|---|---|
| 4,736,300 | A * | 4/1988 | Johnson, Jr. | .................. 702/7 |
| 4,876,511 | A | 10/1989 | Clark | |
| 6,208,585 | B1 | 3/2001 | Stroud | |
| 6,218,842 | B1 * | 4/2001 | Bittar et al. | .................. 324/339 |
| 2005/0088180 | A1 * | 4/2005 | Flanagan | .................. 324/338 |
| 2005/0168224 | A1 | 8/2005 | Freeman | |
| 2005/0189947 | A1 * | 9/2005 | Haugland | .................. 324/338 |
| 2006/0017443 | A1 * | 1/2006 | Folberth et al. | ............. 324/338 |

FOREIGN PATENT DOCUMENTS

| | | |
|---|---|---|
| EP | 1 206 713 B1 | 3/2005 |
| WO | 2006/012497 A1 | 2/2006 |
| WO | 2006/052458 A2 | 5/2006 |

OTHER PUBLICATIONS

German Office Action dated Jan. 11, 2008 for German patent application No. 10 2007 015 727.6-24 and English translation.
Office Action dated Oct. 7, 2009 from British Patent Office for Application No. GB 0706456.1.

* cited by examiner

*Primary Examiner*—Patrick J Assouad
*Assistant Examiner*—David M. Schindler
(74) *Attorney, Agent, or Firm*—Mark E. Scott; Conley Rose, P.C.

(57) ABSTRACT

A method and related system calibrating downhole tools for drift. Some of the illustrative embodiments are a logging tool comprising a tool body, a transmitter antenna associated with the tool body, a transmitter electronics coupled to the transmitter antenna, a first receiver antenna associated with the tool body, a first receiver electronics coupled to the first receiver antenna, and a signal generator separate from the first transmitter electronics, the signal generator coupled to the first receiver electronics, and the first signal generator provides a calibration signal to the first receiver electronics.

11 Claims, 4 Drawing Sheets

METHOD AND SYSTEM FOR CALIBRATING DOWNHOLE TOOLS FOR DRIFT

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

1. Field of the Invention

Various embodiments of the invention are directed to logging tools, such as wireline tools and logging tools used while drilling. More particularly, various embodiments of the invention are directed to calibration of sensors to compensate for tool drift which may be associated with temperature and/or age of the tool.

2. Description of the Related Art

Modern drilling operations demand a great quantity of information relating to the parameters and conditions encountered downhole. Such information typically includes characteristics of the earth formations traversed by the wellbore, as well as information regarding the wellbore itself.

The collection of information relating to conditions downhole, which is commonly referred to as "logging," may be performed by several methods. In wireline logging, a probe or "sonde" is suspended in the borehole by way of an armored cable (the wireline) after some or all of the well has been drilled. There are also tools that collect data during the drilling process. By collecting, processing and transmitting data to the surface real-time while drilling, the timeliness of measurement data of formation properties is improved and, consequently, the efficiency of drilling operations is increased. Tools that are used while drilling may be referred to as measurement-while-drilling (MWD) or logging-while-drilling tools (LWD). While there may be some distinction between MWD and LWD, the terms are often used interchangeably, and for purposes of this specification the term LWD will be used with the understanding that LWD may also refer to MWD operations.

A formation containing hydrocarbons has certain well known physical characteristics, such as resistivity (the inverse of conductivity) within a particular range. Measurements of resistivity are based on attenuation and phase shift of an electromagnetic signals propagating through the formation, and thus it is important to measure amplitude and phase shift accurately. Even small amounts of error are relatively significant given the small amplitude of signals detected at the receiver, which are often on the order of 10 nV. A long-standing phenomenon known as tool drift introduces errors in the measurement of attenuation and phase shift. In particular, as tool temperature varies, and as the tool ages, measurements of attenuation and phase shift of a received electromagnetic signal drift. The amount of drift varies from tool to tool, and can be substantial in deep wells where temperatures can exceed 150° Celsius.

In order to compensate for tool drift, related art logging tools may have their response as a function of temperature determined prior to deployment into the borehole. The downhole measurements are then compensated based on downhole temperature and the temperature response characteristics of the tool. However, determining the temperature response characteristics of a tool is a very time consuming and labor intensive process, and does not account for other drifts that may be encountered in a logging tool, such as the effect of aging. Other techniques may be to use a "compensated" logging tool having multiple symmetric receiver pairs. However, tools that use multiple symmetric receiver pairs require additional components and processing. Compensated tools tend to be longer, thus increasing cost. Moreover, "compensated" tool design requires a particular physical structure of the tool, and thus older tools may not be suited to be retrofitted with multiple symmetric receiver pairs.

BRIEF DESCRIPTION OF THE DRAWINGS

For a more detailed description of the various embodiments of the present invention, reference will now be made to the accompanying drawings, wherein.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION OF THE PREFERRED EMBODIMENT

Figure 1:
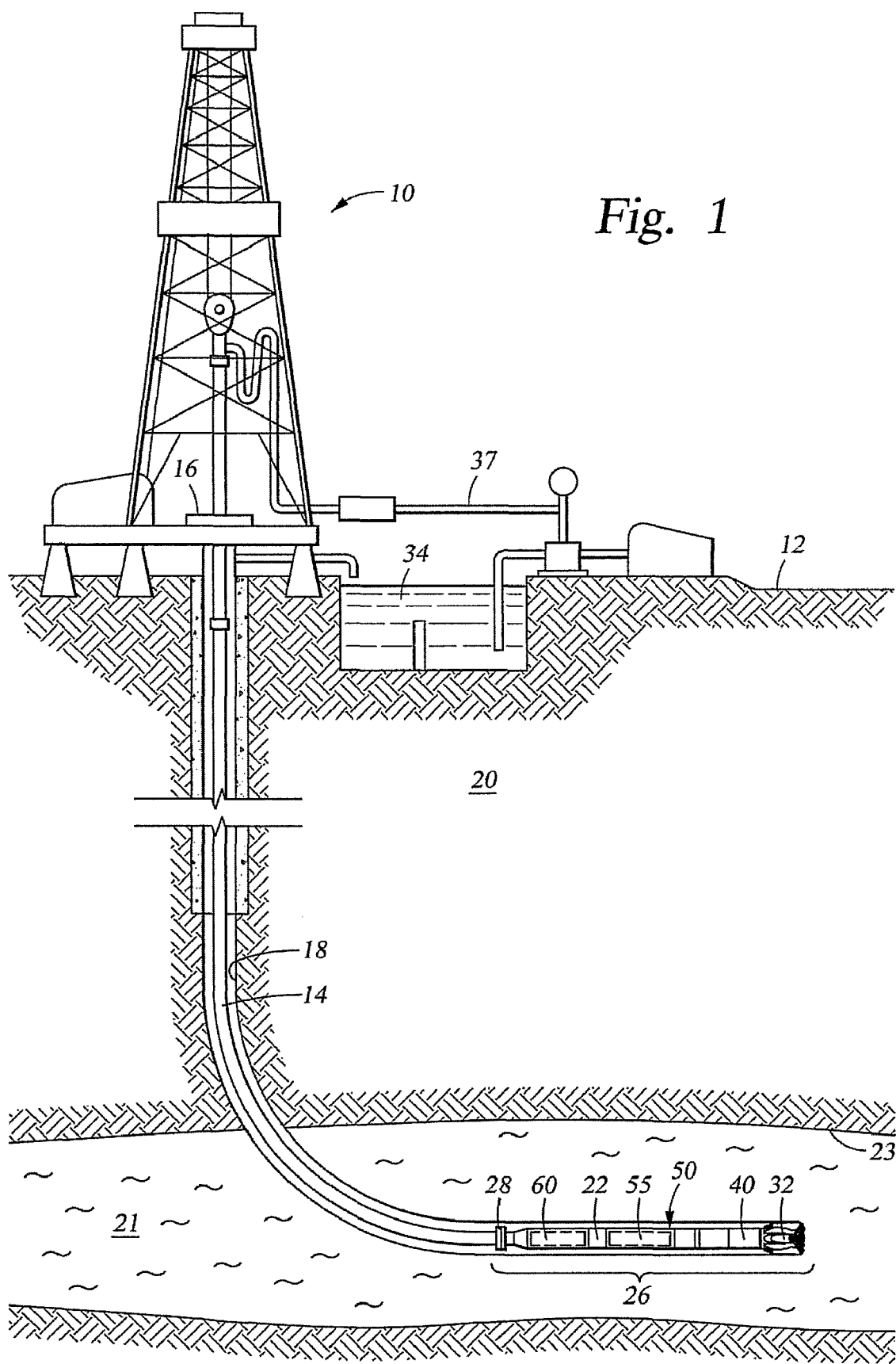
FIG. 1 is an illustrative drilling system.

FIG. 1 illustrates a drilling system. In particular, a drilling system may comprise a drilling rig 10 at the surface 12, supporting a drill string 14. The drill string 14 may be an assembly of drill pipe sections which are connected end-to-end through a work platform 16. A drill bit 32 couples to the lower end of the drill string 14, and through drilling operations the bit 32 creates a borehole 18 through earth formations 20 and 21. The drill string 14 has on its lower end a bottom hole (BHA) assembly 26, which BHA 26 may comprise the drill bit 32, a downhole motor 40, a logging tool 50 mounted on collar section 55, and directional sensors located in a non-magnetic instrument sub 60.

Drilling fluid is pumped from a pit 34 at the surface through the line 37, into the drill string 14 and to the drill bit 32. After flowing out through the face of the drill bit 32, the drilling fluid rises back to the surface through the annular area between the drillstring 14 and the borehole 18, where it is collected and returned to the pit 34 for filtering. The drilling fluid is used to lubricate and cool the drill bit 32 and to remove cuttings from the borehole 18.

A downhole controller 22 controls the operation of telemetry transmitter 28 and orchestrates the operation of downhole components. The controller processes data received from the logging tool 50 and/or sensors in the instrument sub 60 and produces encoded signals for transmission to the surface via the telemetry transmitter 28. The controller 22 may also make decisions based upon the processed data.

Figure 2:
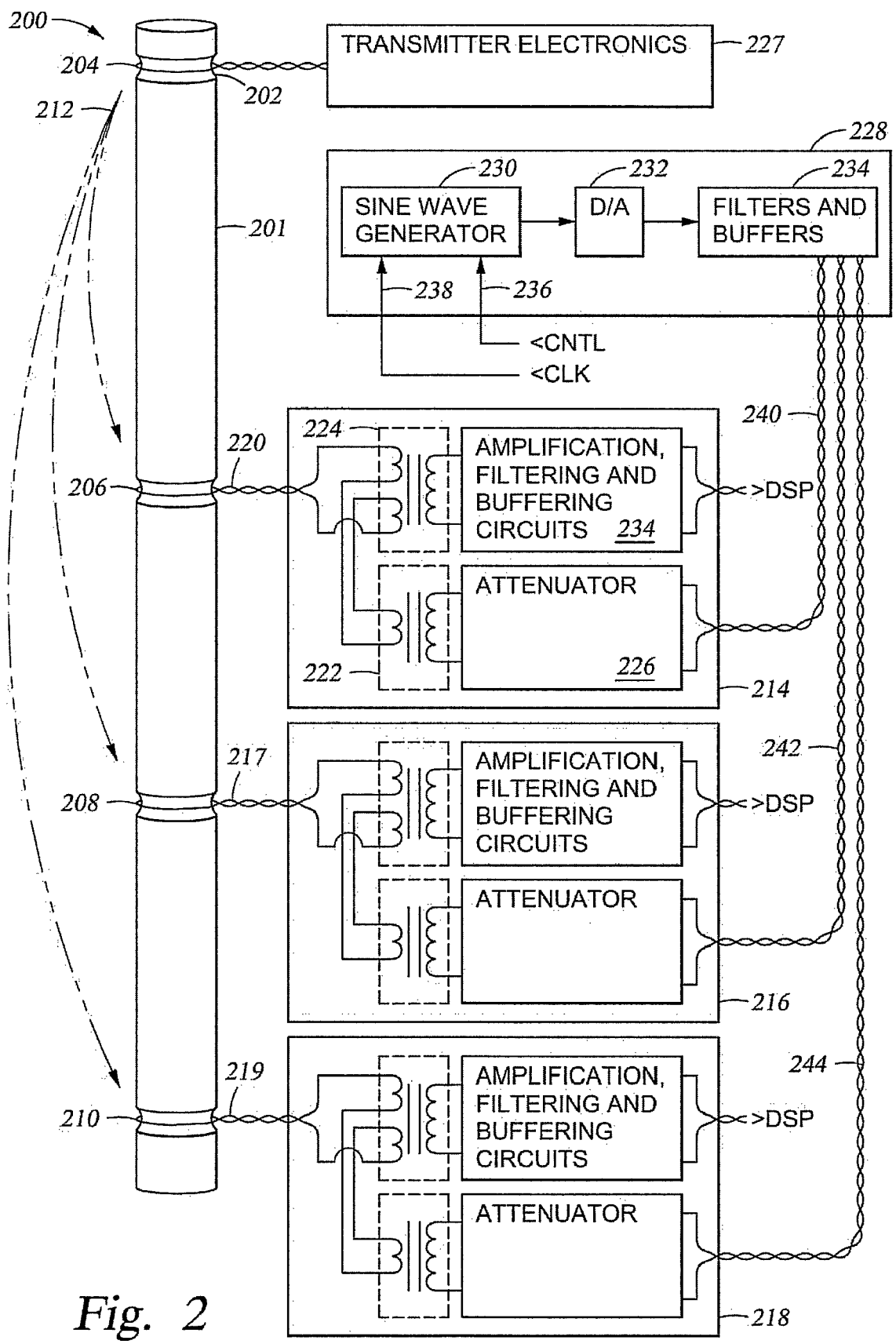
FIG. 2 is a schematic view of resistivity tool in accordance with embodiments of the invention.

FIG. 2 illustrates a resistivity tool 200 in accordance with embodiments of the invention, which tool may either be a wireline tool or an LWD tool, such as logging tool 50 (FIG. 1). The tool may comprise a plurality of regions of reduced diameter, such as region 202. An antenna or wire coil 204 is placed in the region 202 and spaced away from the tool body 201 by a constant distance. In accordance with embodiments of the invention, wire coil 204 is a transmitter antenna or coil, and wire coils 206, 208 and 210 are receiver coils. In operation, transmitter coil 204 generates an interrogating electromagnetic (EM) signal 212 that propagates through a surrounding formation and is received at the receiver coils 206, 208 and 210. The receiver coils, in turn, transmit an indication of the received signals to the controller (not shown in FIG. 2) where the signals are digitized and processed. The controller calculates each electromagnetic signal's amplitude and phase. Amplitude ratios of the EM signal as between the receiver coils, as well as the phase difference of the EM signals as between the receiver coils, are indicative of resistivity of a surrounding formation.

In accordance with embodiments of the invention, calibration of resistivity tool 200 may be made real time to account for tool drift. In particular, and in accordance with embodiments of the invention, a calibration signal is sent through the receiver components in the same way as an interrogating signal detected by the receiver coil(s), and in some situations the calibration signal is sent under approximately the same conditions as an interrogating signal is to be received. Instead of being supplied by the transmitter in the form of an electromagnetic wave, however, a calibration signal in accordance with embodiments of the invention is supplied by a signal generator proximate the receiver electronics. In accordance with some embodiments, determination of tool drift is made at a time close to when the formation resistivity is being measured (i.e. close enough in time that the conditions at the tool have not changed significantly).

FIG. 2 also shows various electronic components that comprise the resistivity tool 200. For purposes of illustration, these various electronic components are shown next to the tool body 201; however, in actual operations these various electronic devices would be housed within the tool body 201, or within other portions of the BHA. Associated with each of the receiver coils 206, 208 and 210 is a receiver electronics 214, 216 and 218, respectively. Receiver coil 206 couples to receiver electronics 214 via harness 220. Receiver coil 208 couples to receiver electronics 216 via harness 217. And receiver coil 210 couples to receiver electronics 218 via harness 219. A calibration board 228 (discussed more fully below) couples to each receiver electronics. Each receiver electronics also couples to a processor (DSP), such as controller 22 (FIG. 1). In some embodiments, each of the receiver coils 206, 208 and 210, as well as the transmitter coil 204, comprise wires or coils positioned around the outside of the tool housing 201. The receiver and transmitter coils, however, may equivalently be other appropriate types of transmitters and receivers, or may be located at other suitable locations. Moreover, the resistivity tool 200 may alternatively contain additional transmitter coils, and more or fewer receiver coils.

Each receiver electronics 214, 216 and 218 are substantially identical, and thus the following discussion, while directed to receiver electronics 214, is equally applicable to each of the receiver electronics 214, 216 and 218. In particular, receiver electronics 214 comprises a transformer 224 that inductively couples received interrogating signals to the amplification, filtering and buffering circuits 234. The receiver electronics 214 also comprises a second transformer 222 that inductively couples the attenuator 226 (discussed more fully below) to both the receiver coil 206 and the amplification, filtering and buffering circuits 234. Although FIG. 2 illustrates two separate transformers 222 and 224 in the receiver electronics 214, in alternative embodiments a single transformer with multiple windings as shown in FIG. 4 may be used.

Figure 4:
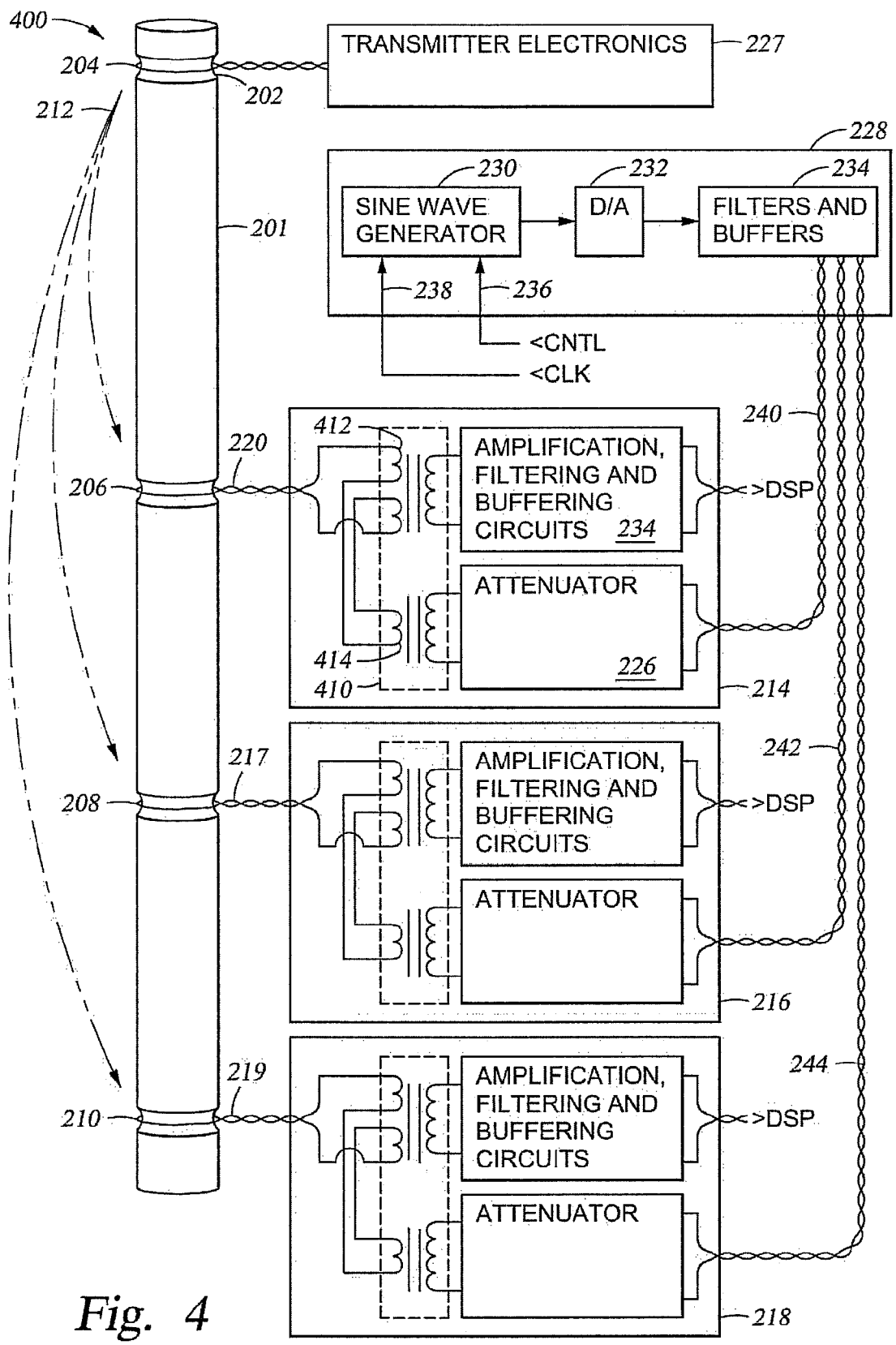
FIG. 4 is a schematic view of resistivity tool with a single transformer in accordance with embodiments of the invention.

FIG. 4 shows a resistivity tool 400 similar to the embodiments of FIG. 2, but having a single transformer 410 with multiple windings. In particular, the transformer 410 comprises at least a first winding 412 and a second winding 414. The first winding 412 of the transformer 410 inductively couples received interrogating signals to the amplification, filtering and buffering circuits 234. The second winding 414 of the transformer 410 inductively couples the attenuator 226 to both the receiver coil 206 and the amplification, filtering and buffering circuits 234.

Still referring to FIG. 2, the resistivity tool 200 also comprises a calibration board 228 that couples to each of the receiver electronics 214, 216 and 218. In accordance with embodiments of the invention, the calibration board 228 comprises a sine wave generator 230, digital-to-analog (D/A) converter 232, and filters and buffers 234. The sine wave generator 230 is designed and configured to create a sine wave of selectable frequency and amplitude. The sine wave generated by illustrative sine wave generator 230 couples to the D/A converter 232, and the analog version of the sine wave created by the D/A converter 232 then couples to the filters and buffers 234. Thus, the sine wave generator 230 as illustrated in FIG. 2 creates a sine wave in a digital sense (a stream of digital values), and is converted by the D/A converter to an analog signal. In alternative embodiments, the sine wave generator may directly generate the analog version of the sine wave with the desired frequency and amplitude. In order to generate the sine wave of desired frequency and amplitude, the sine wave generator may couple to a clock (CLK) signal 238, and likewise may couple to and receive commands from a control (CNTL) signal 236, which may be provided, for example, by the controller 22 (FIG. 1).

Still referring to FIG. 2, the sine wave created by the calibration board 228 is coupled to each of the receiver electronics 214, 216 and 218, for example by way of wiring harnesses 240, 242 and 244 respectively. Use of the sine wave generated by calibration board 228 will be discussed with respect to receiver electronics 214 with the understanding that the discussion is equally applicable to the other receiver electronics 216 and 218. The sine wave generated by the calibration board 228 (hereinafter referred to as the calibration signal), couples to the attenuator 226 by way of the wiring harness 240. In some embodiments, the attenuator 226 attenuates the calibration signal such that as the calibration signal propagates through the receiver coil 206 and receiver electronics 234 it has approximately the same signal strength as an interrogating signal received at the receiver coil 206. In some embodiments, a selectable attenuator may be used in each receiver electronics, enabling the amplitude of each calibration signal to be customized to the signal strength expected at each receiver coil. Selectable attenuation thus allows receiver board amplifiers to be calibrated in real time at different gain settings. In some embodiments, the attenuator is built from passive components in order to reduce drift. After modification by the attenuator 226 (in most cases attenuation), the calibration signal inductively couples through transformer 222 to the harness 220, receiver coil 206 and the various connectors thereof. The calibration signal then inductively couples through the transformer 224 to the receiver electronics 234. After being processed by the receiver electronics, the calibration signal is transmitted to the DSP. Thus, each calibration signal stimulates substantially all the components of the receiver circuit, resulting in testing not only the receiver electronics but also the integrity of the receiver coils, harnesses and various connectors.

In accordance with some embodiments of the invention, the calibration board 228 is located proximate the receiver electronics 214, 216 and 218. In this context, "proximate" means closer to the receiver electronics than to the transmitter coil. Because the distance is preferably relatively short, crosstalk and electrical interference of signals traveling on the harnesses is less severe and less likely. Moreover, and as illustrated, the transmitter electronics 227 and receiver electronics 214, 216 and 218 are preferably isolated on separate boards, further minimizing the potential for cross-talk. Further still, the presence of an attenuator on each receiver board 214, 216 and 218 allows a calibration signal of significantly greater signal strength to be transmitted between the calibration board 228 and the various receiver electronics 214, 216 and 218, thus improving the signal-to-noise ratio of a calibration signal received at each receiver electronics.

Another advantage of many embodiments of the invention is the use of a signal generator to generate the calibration signal, rather than use of the transmitter electronics. Using an independent system generating low level signals for the receiver input reduces the amount of power required to generate the calibration signal, extending battery life in LWD devices. Use of a separate signal generator for the calibration signal also allows placement of the signal generator proximate the receiver components, obviating the need for long wiring harnesses between the transmitter electronics and the receiver electronics.

Figure 3:
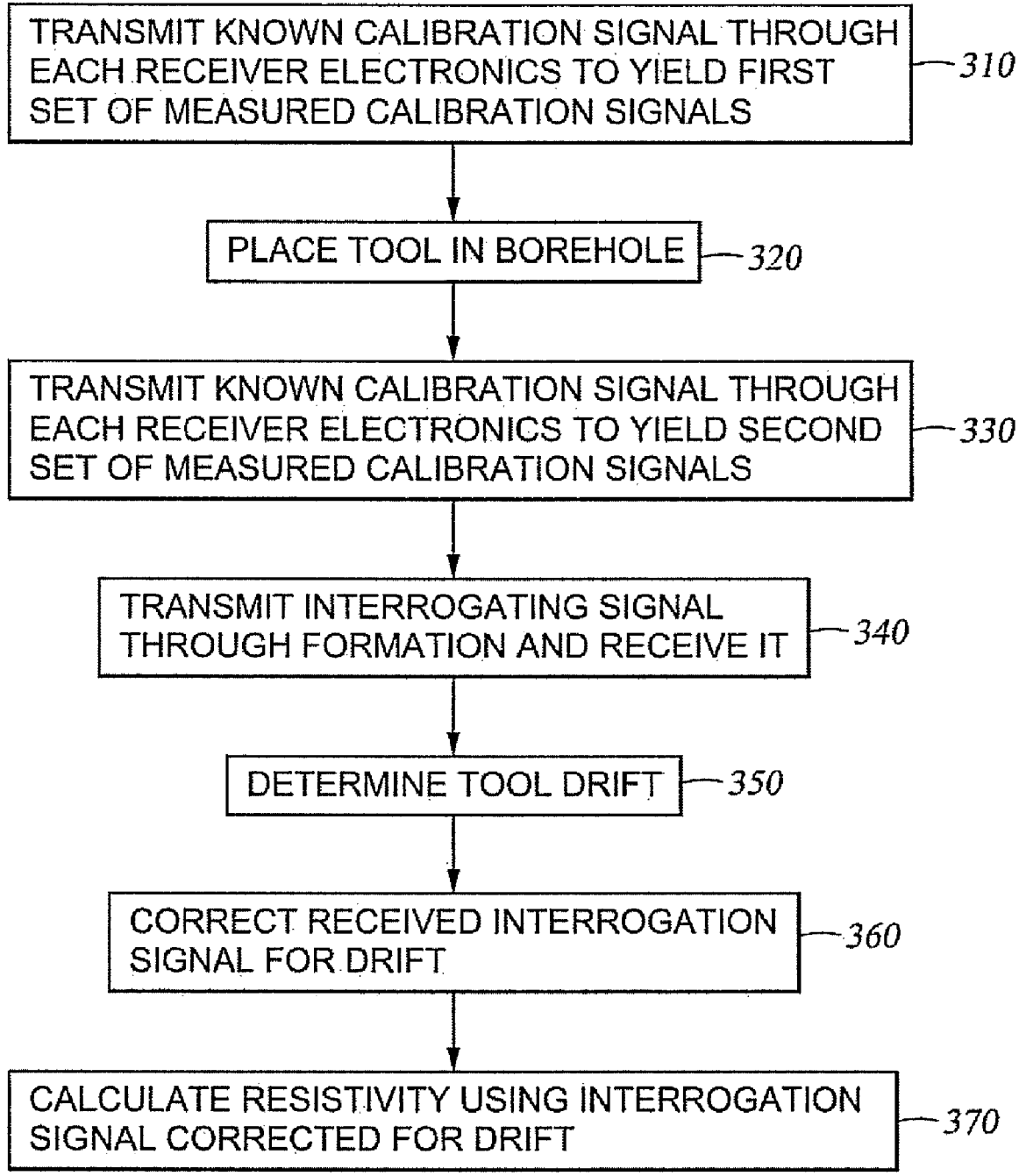
FIG. 3 is a method in accordance with embodiments of the invention.

FIG. 3 illustrates a method in accordance with embodiments of the invention. In particular, the illustrative process starts by transmitting a known calibration signal through each receiver electronics to yield a first set of measured calibration signals (block 310). Thereafter, the logging tool is placed in a borehole (block 320). In alternative embodiments, the initial calibration (block 310) may be completed after the tool is placed within the borehole (block 320). At a time later than the initial calibration (block 310) another known calibration signal is transmitted through each receiver electronics (block 330), yielding a second set of measured calibration signals. Thereafter, an interrogating signal may be transmitted through the formation and received by the logging tool (block 340). Although the illustrative method of FIG. 3 shows that the transmission of the interrogating signal is done after measuring the second set of calibration signals, in alternative embodiments the transmission of interrogating signals through the formation may performed before the second transmission of the calibration signal. Regardless of the precise order, it is preferable that the second calibration signal be provided to the receiver coil and receiver electronics under similar conditions as receipt of the interrogation signal through the formation. Thereafter, tool drift is determined, possibly by comparison of the measured calibration signals (block 350). After determining tool drift (block 350), the received interrogation signals are corrected for tool drift (block 360). Finally, a calculation of resistivity may be made using the interrogation signals corrected for drift (block 370). Because the calibration signal is transmitted through the resistivity tool under the same (or very similar) conditions to those the tool is operating under downhole, the effects of tool drift on each calibration signal and on the received interrogating signal is substantially the same, thus making the correction for tool drift more accurate.

In some embodiments, correcting for tool drift may be accomplished downhole, such as by the controller 22 (FIG. 1). In these cases, the controller may send resistivity readings to the surface where the underlying data has already been corrected for tool drift. In alternative embodiments, the sets of calibration signals may be telemetered to the surface, along with the received interrogation signals, and surface computers (not specifically shown) may make the appropriate corrections for tool drift. In cases where downhole devices make corrections for tool drift and calculate resistivity, decisions regarding drilling parameters (such as direction), may also be made downhole.

One advantage of the various embodiments is the ability to test the receiver coils and harnesses. By including these components, a full picture is provided of possible sources of tool drift. Nonetheless, it is believed that drift is primarily associated with active electronics, and more specifically the active electronics associated with processing the signal detected at the receiver coils. The term "active" as used herein means a circuit that requires external power to operate, as opposed to "passive" circuits that do not require a supply of external to operate. The drift in phase and gain due to receiver antennae and harnesses remains relatively stable, due to the passive nature of these components. Thus, it is believed that the reduction or elimination of drift in the active receiver electronics results in the elimination of the majority of drift in the logging tool. In accordance with alternative embodiments of the invention, the calibration signal may be provided only through the active components.

While various embodiments of this invention have been shown and described, modifications thereof can be made by one skilled in the art without departing from the spirit or teaching of this invention. For example, any number of transmitters or receivers may be used. Moreover, although it is expected that calibration of at least the active receiver electronics in a resistivity tool is the most cost effective and efficient approach to minimizing the effects of drift on resistivity tool measurements, it should be appreciated that the various embodiments may be applied to any component of a tool that is subject to tool drift. Further still, applying low strength calibration signal to receiver coil and electronics saves power over applying a large signal to transmitter, and thus the embodiments are particularly suited to a LWD environment; however, the various embodiments may also find application in a wireline tool. Accordingly, the scope of protection is not limited to the embodiments described herein, but is only limited by the claims which follow, the scope of which shall include all equivalents of the subject matter of the claims.

What is claimed is:

1. A logging tool, comprising:
   a tool body;
   a transmitter antenna associated with the tool body;
   a transmitter electronics coupled to the transmitter antenna;
   a first receiver antenna associated with the tool body;
   a first receiver electronics coupled to the first receiver antenna, the first receiver electronics comprising:
      an attenuator circuit coupled to the first receiver antenna and an amplification circuit by way of a first transformer; and
      the amplification circuit coupled to the first receiver antenna by way of a second transformer;
      the attenuator circuit attenuates a calibration signal and thereby creates an attenuated calibration signal provided to the amplification circuit, the attenuated calibration signal provided to the amplification circuit by way of the first transformer, the first receiver antenna, and the second transformer; and a signal generator separate from the transmitter electronics, the signal generator coupled to the first receiver electronics, and the signal generator provides the calibration signal to the first receiver electronics.

2. The logging tool of claim 1, further comprising a second receiver antenna; and a second receiver electronics coupled to the second receiver antenna and the signal generator;

the signal generator provides the calibration signal to the second receiver electronics.

3. The logging tool of claim 1 wherein the attenuator circuit selectively attenuates the calibration signal.

4. The logging tool of claim 1 wherein the tool body is a wireline logging tool.

5. The logging tool of claim 1 wherein the tool body is a logging while drilling tool.

6. The logging tool of claim 1, further comprising a second receiver antenna; and a second receiver electronics coupled to the second receiver antenna and the signal generator, the second receiver electronics comprising:

an attenuator circuit; and an amplification circuit coupled to the attenuator circuit of the second receiver electronics and the second receiver antenna;

said attenuator circuit of the second receiver electronics attenuates a calibration signal and thereby creates an attenuated calibration signal provided to the amplification circuit of the second receiver electronics;

said signal generator provides the calibration signal to the second receiver electronics; and said attenuator circuit of the first receiver electronics provides different attenuation than the attenuator circuit of the second receiver electronics.

7. A logging tool comprising:

a tool body;

a transmitter antenna associated with the tool body;

a transmitter electronics coupled to the transmitter antenna;

a first receiver antenna associated with the tool body;

a first receiver electronics coupled to the first receiver antenna, the first receiver electronics comprising:

a transformer with multiple windings;

an attenuator circuit coupled to the first receiver antenna and an amplification circuit by way of a first winding of the transformer; and the amplification circuit coupled to the first receiver antenna by way of a second winding of the transformer;

the attenuator circuit attenuates a calibration signal and thereby creates an attenuated calibration signal provided to the amplification circuit, the attenuated calibration signal provided to the amplification circuit by way of the first winding, the first receiver antenna, and the second winding; and a signal generator separate from the transmitter electronics, the signal generator coupled to the first receiver electronics, and the signal generator provides the calibration signal to the first receiver electronics.

8. The logging tool of claim 7, further comprising a second receiver antenna; and a second receiver electronics coupled to the second receiver antenna and the signal generator;

the signal generator provides the calibration signal to the second receiver electronics.

9. The logging tool of claim 7 wherein the attenuator circuit selectively attenuates the calibration signal.

10. The logging tool of claim 7 wherein the tool body is a wireline logging tool.

11. The logging tool of claim 7 wherein the tool body is a logging while drilling tool.

* * * * *